United States Patent
Jaworski et al.

(10) Patent No.: US 10,112,665 B2
(45) Date of Patent: Oct. 30, 2018

(54) ROOF ASSEMBLIES FOR TRAILERS

(71) Applicant: Hyundai Translead, San Diego, CA (US)

(72) Inventors: Leszek Jaworski, San Diego, CA (US); Alvaro Frausto, San Diego, CA (US); Humberto Benitez, San Diego, CA (US)

(73) Assignee: HYUNDAI TRANSLEAD, San Diego, CA (US)

( * ) Notice: Subject to any disclaimer, the term of this patent is extended or adjusted under 35 U.S.C. 154(b) by 0 days.

(21) Appl. No.: 15/345,265

(22) Filed: Nov. 7, 2016

(65) Prior Publication Data

US 2018/0015972 A1    Jan. 18, 2018

Related U.S. Application Data

(60) Provisional application No. 62/361,393, filed on Jul. 12, 2016.

(51) Int. Cl.
| | | |
|---|---|---|
| *B62D 63/08* | (2006.01) | |
| *B62D 29/00* | (2006.01) | |
| *B62D 29/04* | (2006.01) | |

(52) U.S. Cl.
CPC ........... *B62D 63/08* (2013.01); *B62D 29/001* (2013.01); *B62D 29/007* (2013.01); *B62D 29/008* (2013.01); *B62D 29/043* (2013.01)

(58) Field of Classification Search
CPC ....... B62D 63/08; B62D 33/096; B62D 25/06

USPC .............................................. 296/185.1, 210
See application file for complete search history.

(56) References Cited

U.S. PATENT DOCUMENTS

| | | | | | |
|---|---|---|---|---|---|
| 2,934,372 | A | * | 4/1960 | Jewell ................... | B62D 29/00 105/409 |
| 3,034,824 | A | * | 5/1962 | Schubach .............. | B62D 33/04 296/181.7 |
| 4,403,804 | A | * | 9/1983 | Mountz ................ | B62D 35/001 296/15 |
| 4,904,017 | A | * | 2/1990 | Ehrlich .................. | B62D 27/02 296/186.1 |
| 5,218,792 | A | * | 6/1993 | Cooper .................... | B60P 3/32 296/203.03 |
| 5,472,290 | A | * | 12/1995 | Hulls ................... | B62D 33/046 296/181.3 |
| 2009/0230727 | A1 | * | 9/2009 | Ehrlich ................ | B62D 33/046 296/185.1 |
| 2009/0236873 | A1 | * | 9/2009 | Kroppe .................. | B62D 33/04 296/186.1 |
| 2011/0221232 | A1 | * | 9/2011 | Haire ..................... | B62D 33/04 296/185.1 |
| 2013/0175828 | A1 | * | 7/2013 | White .................... | B62D 25/04 296/203.03 |
| 2013/0207415 | A1 | * | 8/2013 | Wylezinski .......... | B62D 27/026 296/185.1 |

* cited by examiner

*Primary Examiner* — Jason S Morrow
(74) *Attorney, Agent, or Firm* — Procopio, Cory, Hargreaves & Savith LLP

(57) ABSTRACT

A multi-piece roof assembly for a trailer includes: a first section configured with a sandwich panel having a convex shape; and at least one additional section configured with a flexible sheet panel coupled to the first section and to at least one top rail assembly.

20 Claims, 3 Drawing Sheets

ROOF ASSEMBLIES FOR TRAILERS

CROSS-REFERENCE TO RELATED APPLICATIONS

This application claims the benefit of priority under 35 U.S.C. § 119(e) of U.S. Provisional Patent Application No. 62/361,393, filed Jul. 12, 2016, entitled "Roof Assemblies for Trailers." The disclosure of the above-referenced application is incorporated herein by reference.

BACKGROUND

Field of the Invention

The present invention relates to truck trailers, and more specifically, to roof assemblies for the truck trailers.

Background

Conventional composite sandwich panel roof assemblies for trailers are configured with a sandwich panel typically made up of a composite material including a plastic core and steel outer layers surrounding the core. Although the roof configured with the sandwich panel provides strong support for the load (e.g., a person walking on the roof), it does not provide good flexibility for the curved surface of the roof, while providing easy coupling to the flat surface of the top rail assemblies. Thus, the curved or cambered surface of the sandwich panel roof coupling to the flat surface of the top rail assemblies may leave a gap which needs to be filled.

One of the common roof assemblies for trailers is made of a composite sandwich panel, plywood or similar material. This type of roof is shaped and has the convex side oriented up. This is a self-supporting roof and it does not require any additional support (roof bows). The roof is only attached along the perimeter. Since the side edges of the roof are straight lines, attaching the roof to the side upper rails is rather easy. However, attaching stiff cambered roof shell to the flat front upper rail and flat rear rail/header require installation of spacers to fill the gap between the flat rail and convex roof shell.

SUMMARY

The present disclosure describes roof assemblies for trailers.

In one embodiment, a multi-piece roof assembly for a trailer is disclosed. The multi-piece roof assembly includes: a first section configured with a sandwich panel having a convex shape; and at least one additional section configured with a flexible sheet panel coupled to the first section and to at least one top rail assembly.

In another embodiment, a roof assembly for a trailer coupled to a front top rail assembly and a rear frame header is disclosed. The roof assembly includes: a cambered sandwich panel; a first sheet panel coupled to the cambered sandwich panel and the front top rail assembly; and a second sheet panel coupled to the cambered sandwich panel and the rear frame header.

Other features and advantages of the present disclosure should be apparent from the present description which illustrates, by way of example, aspects of the invention.

BRIEF DESCRIPTION OF THE DRAWINGS

The details of the present disclosure, both as to its structure and operation, may be gleaned in part by study of the appended further drawings, in which like reference numerals refer to like parts, and in which.

DETAILED DESCRIPTION

As stated above, conventional roof assemblies for truck trailers are curved (or cambered), while the top rail assemblies are typically configured as a single piece rail that is flat at the top. However, the cambered design of the roof assemblies does not interface well with the flat-top design of the top rail assemblies. Thus, the interface can leave a gap between the top rail and the cambered roof panel. The disadvantage of leaving the gap between the cambered roof panel and the top rail is that contaminants, such as snow or rain, may be hard to remove once the contaminants are in the gap.

Embodiments of the present disclosure are configured to substantially reduce the necessity of filling the gap between the flat rail/header and the cambered roof by adding a front section and/or a rear section made with thin aluminum or other flexible sheets and coupling the section(s) to the stiff cambered roof shell. These flexible sheets can be attached to the flat surfaces of the front top rail (which can also be referred to as "front top rail assembly") and/or the rear frame header (which can also be referred to as "rear top rail assembly").

In one embodiment of the present disclosure, a multi-piece roof assembly is disclosed. The multi-piece roof assembly includes a sandwich panel and at least one aluminum sheet panel coupled to the sandwich panel at the front section and/or the rear section of the roof. Thus, the multi-piece roof assembly can be configured into one of three configurations: (1) an aluminum sheet panel at the front section of the trailer roof and a sandwich panel attached to the aluminum sheet panel; (2) an aluminum sheet panel at the rear section of the trailer roof and a sandwich panel attached to the aluminum sheet panel; and (3) a first aluminum sheet panel at the front section of the trailer roof, a second aluminum sheet panel at the rear section of the trailer roof, and a sandwich panel attached to both the first and the second aluminum sheet panels. In one embodiment, the aluminum sheet panel can be replaced with other flexible material including thin steel sheets, polymers, and fiberglass-reinforced plastic.

The sandwich panel can be configured with a composite material including a plastic core and steel outer layers surrounding the core. Each of the at least one aluminum sheet panel can be bonded (or attached by other means) to the front and side top rails, as well as to the rear header using bonding material. Each aluminum sheet panel also can be crimped around the top rails and rear header in addition to being bonded.

Figure 1:
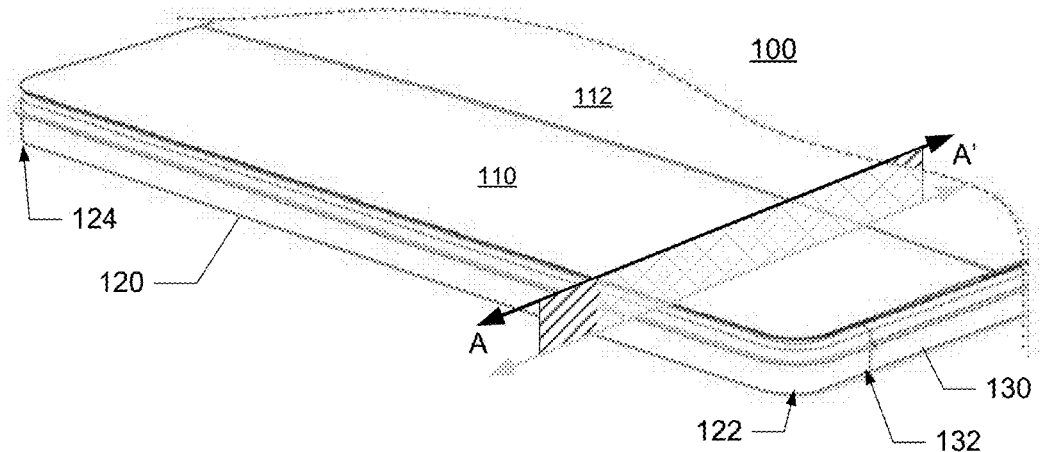
FIG. 1 is a perspective view of a roof assembly in accordance with one embodiment of the present disclosure.

FIG. 1 is a perspective view of a roof assembly 100 in accordance with one embodiment of the present disclosure. The illustrated embodiment of FIG. 1 shows the front section of the roof assembly 100 including an aluminum sheet panel 110 at the front of the trailer roof and a sandwich panel 112 attached to the aluminum sheet panel 110. FIG. 1 also shows the aluminum sheet panel 110 attached to the top front rail 120 and the top side rail 130. The top front rail 120 can also include rounded-end corners 122, 124. The rounded-end corners 122, 124 enable the top front rail to smoothly couple (along line 132) to the top side rails (including rail 130).

Figure 2:
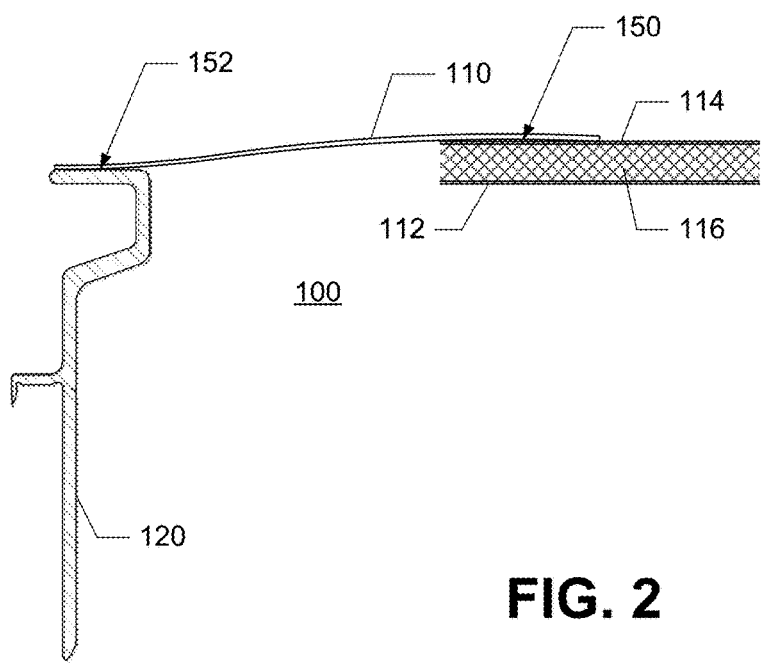
FIG. 2 is a cross-sectional view of the roof assembly sliced along the lines A-A' shown in FIG. 1.

FIG. 2 is a cross-sectional view of the roof assembly 100 sliced along the lines A-A' shown in FIG. 1. The cross-sectional view shows the details of coupling the roof assembly 100 to the top front rail 120.

In the illustrated embodiment of FIG. 2, the roof assembly 100 includes a sandwich panel 112 attached to an aluminum sheet panel 110 using attachment means or bonding material 150. In one embodiment, the sandwich panel 112 is configured with a composite material including a plastic core 116 and steel outer layers 114 surrounding the core 116. This configuration provides strong support for the load placed on the roof. However, this configuration does not provide flexibility needed to couple the cambered roof (including the sandwich panel) to the top rails of the trailer (e.g., the top front rail 120). Thus, the aluminum sheet panel 110 is provided and added at the front (and, in some embodiments, at the rear shown, for example, in FIG. 5) to provide the flexibility. Accordingly, in FIG. 2, the aluminum sheet panel 110 attaches to the sandwich panel 112 and the top front rail 120 using attachment means and/or bonding material 150, 152, respectively. The attachments means can be any combination of adhesives, mechanical fasteners, and other attachment means and methods including welding.

Figure 3:
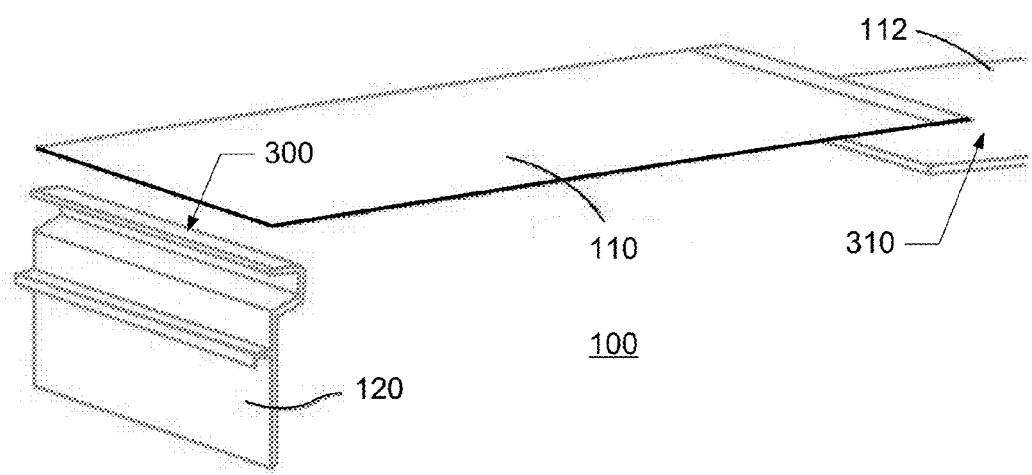
FIG. 3 is a cross-sectional perspective view of the roof assembly showing the aluminum sheet panel placed between the sandwich panel and the top front rail.

FIG. 3 is a cross-sectional exploded view of a multi-piece roof assembly 100 showing the aluminum sheet panel 110 placed between the sandwich panel 112 and the top front rail 120. In the illustrated embodiment of FIG. 3, the top surface 300 of the top front rail 120 is configured to be flat, while the surface 310 of the sandwich roof panel 112 is configured to be cambered or curved (e.g. a convex shape). Accordingly, the sheet panel 110 acts as a connector between the cambered roof 112 and the flat top rail 120. In some embodiments, a similar configuration can be added to the rear section, as shown in FIGS. 4 and 5.

Figure 4:
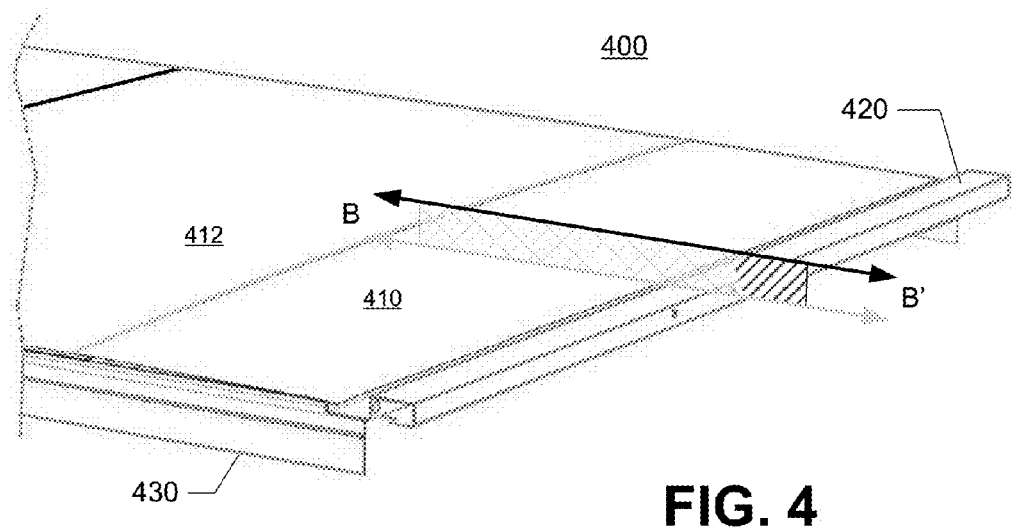
FIG. 4 is a perspective view of a roof assembly in accordance with one embodiment of the present disclosure.

FIG. 4 is a perspective view of a roof assembly 400 in accordance with one embodiment of the present disclosure. The illustrated embodiment of FIG. 4 shows the rear section of the roof assembly 400 (similar to roof assembly 100 which shows the front section) including an aluminum sheet panel 410 at the rear of the trailer roof and a sandwich panel 412 attached to the aluminum sheet panel 410. FIG. 4 also shows the aluminum sheet panel 410 attached to the rear header 420 and the top side rail 430.

Figure 5:
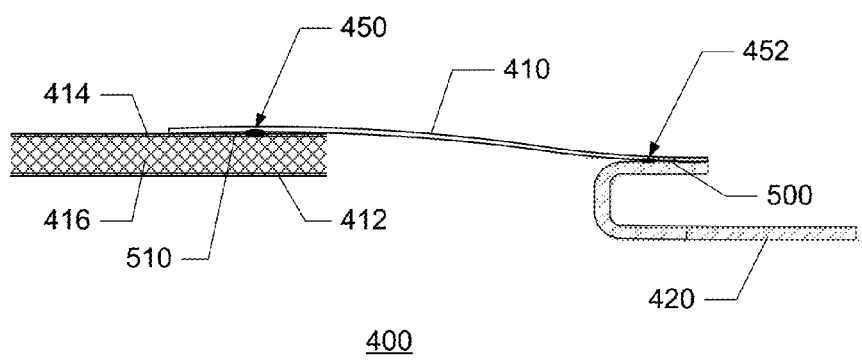
FIG. 5 is a cross-sectional view of the roof assembly sliced along the lines B-B' shown in FIG. 4.

FIG. 5 is a cross-sectional view of the roof assembly 400 sliced along the lines B-B' shown in FIG. 4. The cross-sectional view shows the details of coupling the roof assembly 400 to the rear header 420.

In the illustrated embodiment of FIG. 5, the roof assembly 400 includes a sandwich panel 412 attached to an aluminum sheet panel 410 using attachment means 450. The attachments means can be any combination of adhesives, mechanical fasteners, and other attachment means and methods including welding.

In one embodiment, the sandwich panel 412 is configured with a composite material including a plastic core 416 and steel outer layers 414 surrounding the core 416. Similar to the front section, the top surface 500 of the rear frame header 420 is configured to be flat, while the surface 510 of the sandwich roof panel 412 is configured to be cambered or curved (e.g. a convex shape). Accordingly, the sheet panel 410 acts as a connector between the cambered roof 412 and the flat top rear frame header 420. This configuration provides strong support for the load placed on the roof, while providing flexibility needed to couple the cambered roof to the rear frame header of the trailer.

The descriptions of the disclosed embodiments are provided to enable any person skilled in the art to make or use the disclosure. Various modifications to these embodiments will be readily apparent to those skilled in the art, and the generic principles described herein can be applied to other embodiments without departing from the spirit or scope of the disclosure. Thus, it is to be understood that the description presented herein represent embodiments representative of the subject matter which is broadly contemplated by the present disclosure.

Examples of embodiments are shown on the following pages. All features of each example are not necessarily required in a particular embodiment. Other solutions can also be used (off the shelf or custom made). Suggestions for requirements refer to a particular embodiment and not necessarily all embodiments.

Additional variations and embodiments are also possible. Accordingly, the technology is not limited only to the specific examples noted herein.

The invention claimed is:

1. A multi-piece roof assembly for a trailer, the roof assembly comprising:
a first section configured with a sandwich panel having a convex shape; and
at least one additional section, each section of the at least one additional section configured with a sheet panel having at least a first side and a second side,
wherein the first side is coupled to the first section and the second side is coupled to each assembly of at least one top rail assembly having a flat top surface,
wherein the sheet panel is configured to be bendable to enable the convex shape of the first section to attach to the flat top surface of each assembly of the at least one top rail assembly through the sheet panel.

2. The multi-piece roof assembly of claim 1, wherein the sheet panel includes one of aluminum, thin steel sheets, polymers, or fiberglass-reinforced plastic.

3. The multi-piece roof assembly of claim 1, wherein the at least one top rail assembly includes a front top rail assembly and a rear frame header.

4. The multi-piece roof assembly of claim 3, wherein the at least one additional section includes a second section coupled to the front top rail assembly and a third section coupled to the rear frame header.

5. The multi-piece roof assembly of claim 3, wherein the at least one additional section includes a second section coupled to the front top rail assembly.

6. The multi-piece roof assembly of claim 3, wherein the at least one additional section includes a second section coupled to the rear frame header.

7. The multi-piece roof assembly of claim 1, wherein the sandwich panel is configured with a composite material including a plastic core and a pair of steel outer layers surrounding the plastic core.

8. The multi-piece roof assembly of claim 7, wherein the core is made of plastic.

9. The multi-piece roof assembly of claim 7, wherein the outer layers are made of metallic material.

10. The multi-piece roof assembly of claim 9, wherein the metallic material is steel.

11. The multi-piece roof assembly of claim 1, further comprising
bonding material applied between the at least one additional section and the first section, the bonding material also applied between the at least one addition section and the at least one top rail assembly.

12. A roof assembly for a trailer coupled to a front top rail assembly and a rear frame header, the roof assembly comprising:
a cambered sandwich panel having a convex shape;
a first sheet panel having at least a first side and a second side,
wherein the first side is coupled to the cambered sandwich panel and the second side is coupled to the front top rail assembly having a flat top surface,
wherein the first sheet panel is configured to be bendable to enable the convex shape of the cambered sandwich panel to attach to the flat top surface of the front top rail assembly through the first sheet panel; and
a second sheet panel having at least a third side and a fourth side,
where in the third side is coupled to the cambered sandwich panel and the fourth side is coupled to the rear frame header having a flat top surface,
wherein the second sheet panel is configured to be bendable to enable the convex shape of the cambered sandwich panel to attach to the flat top surface of the rear frame header through the second sheet panel.

13. The roof assembly of claim 12, wherein the first sheet panel and the second sheet panel are made of aluminum.

14. The roof assembly of claim 12, wherein the cambered sandwich panel is configured with a composite material including a core and metal outer layers surrounding the core.

15. The roof assembly of claim 14, wherein the core is made of plastic.

16. The roof assembly of claim 14, wherein the metal outer layers are made of steel.

17. The roof assembly of claim 12, further comprising
an adhesive applied between the cambered sandwich panel and the first sheet panel.

18. The roof assembly of claim 17, wherein the adhesive is also applied between the first sheet panel and the front top rail assembly.

19. The roof assembly of claim 12, further comprising
an adhesive applied between the cambered sandwich panel and the second sheet panel.

20. The roof assembly of claim 19, wherein the adhesive is also applied between the second sheet panel and the rear frame header.

* * * * *